United States Patent Office 3,141,166
Patented July 14, 1964

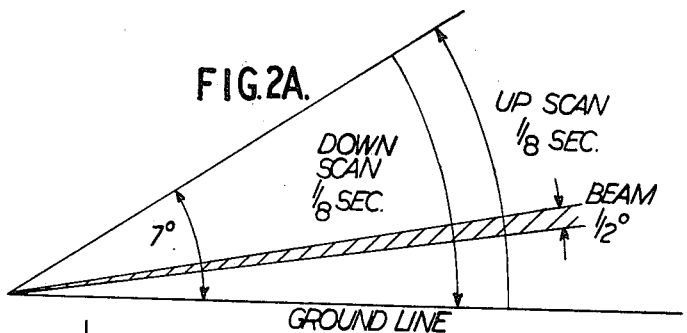
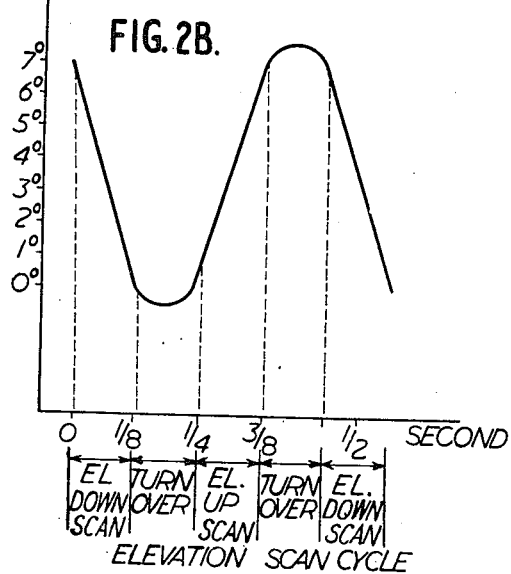
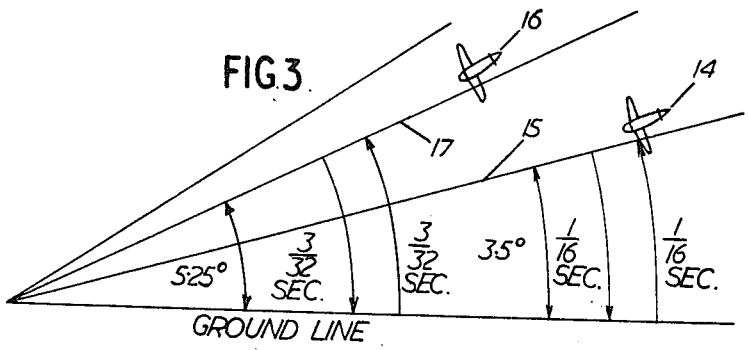

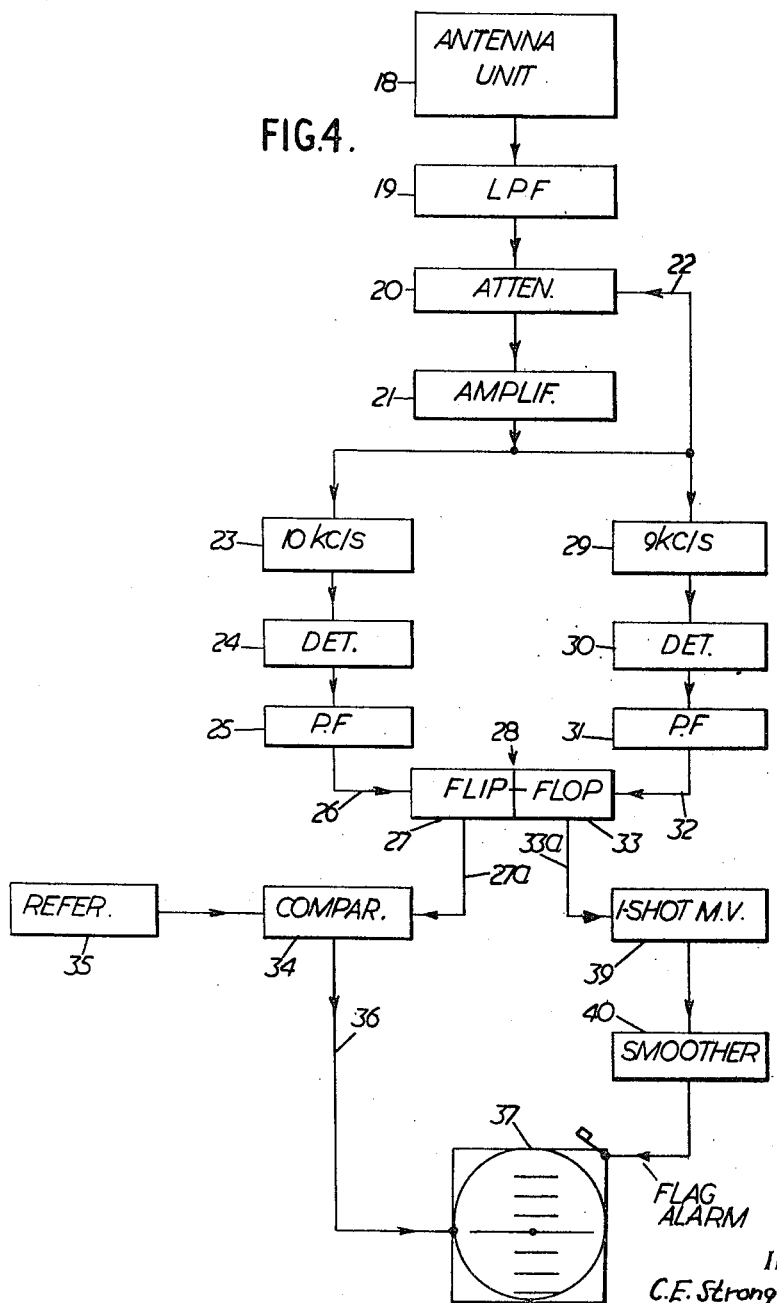

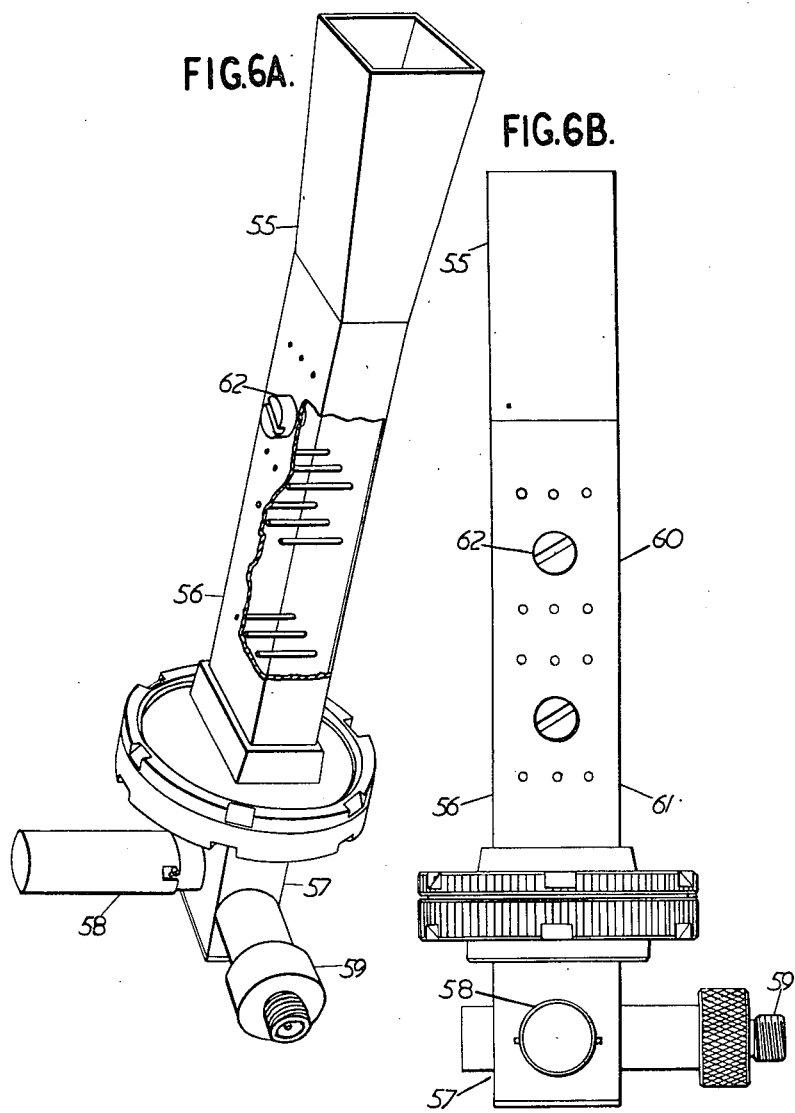

3,141,166
RADIO BEACON SYSTEM
Charles Eric Strong, William Littery Garfield, and Anthony Newton Lawson, all of London, England, assignors to International Standard Electric Corporation, New York, N.Y.
Filed Oct. 28, 1958, Ser. No. 770,213
Claims priority, application Great Britain Oct. 31, 1957
5 Claims. (Cl. 343—106)

This invention relates to radio systems for aiding the navigation of a mobile craft along a desired path. More particularly but not exclusively, it relates to approach beacon systems such as are used for guiding aircraft into an aerodrome runway.

In the aircraft navigation field there are already known approach systems which involve the use of two approach beacons, one of which defines a guide course in the azimuth plane to direct the aircraft along the runway ("localizer beacon") while the other defines a "glide path" course which will guide the aircraft down to a landing point on the runway.

In a now obsolete form of approach beacon system a single stationary directive radiation pattern was emitted by the beacon and the aircraft was navigated so as to maintain the received beacon field at a predetermined constant intensity.

In another known approach beacon system, two stationary overlapping directive radiation patterns are emitted by the beacon, and the aircraft is navigated so as to maintain a predetermined constant ratio (usually equality) between the signals set up at the aircraft by the two patterns.

While such over-lapping-pattern systems are widely used and render valuable service, they have the defect that the radiation from the beacon illuminates the ground and any obstacles in front of the beacon, and may thereby generate spurious reflections which give rise to false course indications, the departure from correct course indication varying not only with the beacon site but also with the position of the aircraft with respect to the sources of reflection. In addition, there is the restriction that any aircraft must approach at the angle for which the beacon is set, and cannot choose its own approach angle.

In order to avoid these objections the present invention provides a radio system for aiding the navigation of a mobile craft along a desired path in which an arc of the approach zone is scanned with a beam of electromagnetic energy moving with predetermined angular velocity in which means is provided on a craft for determining the time interval between successive illuminations of the craft by the said beam and for automatically indicating the angle of approach denoted by said time interval.

The invention will be better understood from the following description of an embodiment in the form of a radio glide path system, reference being had to the several figures of the accompanying drawings, in which:

FIG. 2A illustrates the extent of the beam scanning in the plane of elevation;

Figure 5:
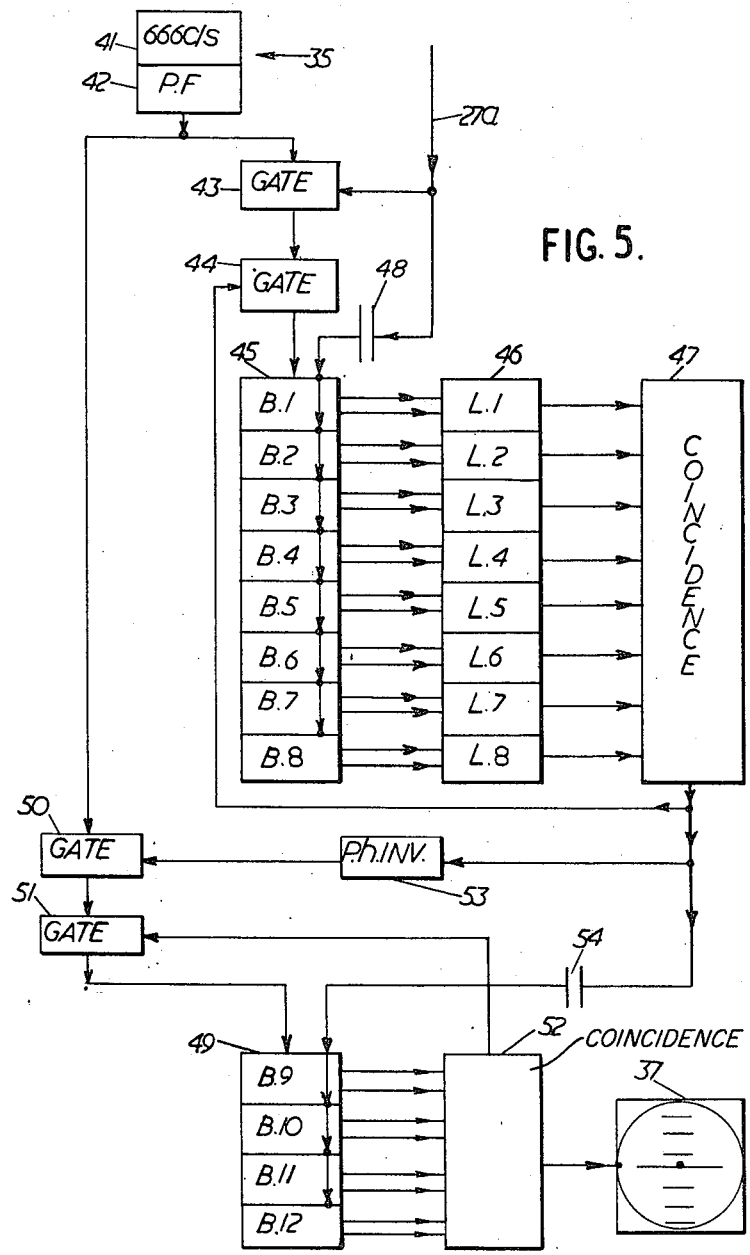

FIG. 2B illustrates graphically the variation of the beam angle with time over a complete scanning cycle, FIG. 3 is referred to in connection with the build-up of the time interval indicative of particular glide paths, FIG. 4 is a block diagram of airborne receiving equipment according to the invention, FIG. 5 is a block diagram illustrating a preferred time comparison arrangement for use in equipment according to FIG. 4, FIG. 6A is a perspective view in part section of the airborne antenna unit, FIG. 6B is a plan view of the antenna unit of FIG. 6A.

Figure 1:
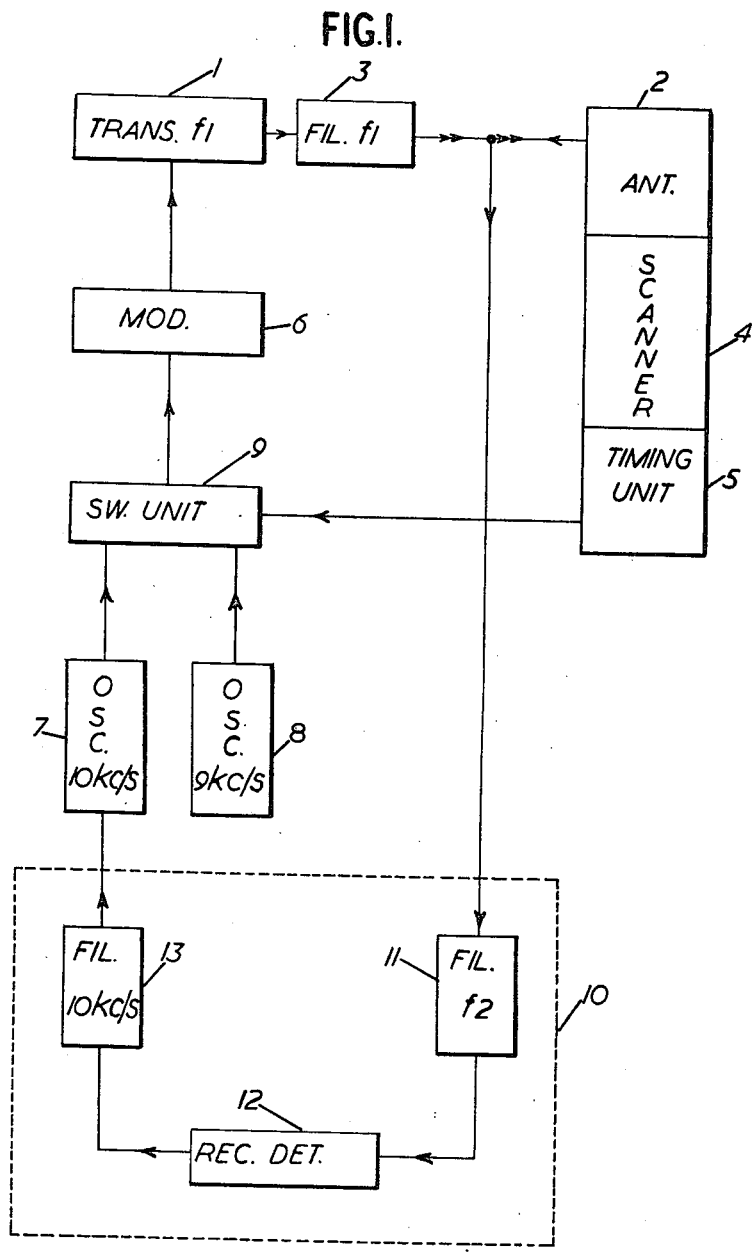
FIG. 1 is a block schematic illustration of a glide path approach beacon station according to the present invention.

FIG. 1 is a block schematic illustration of a glide path approach beacon station according to the present invention, for operation on frequencies in the X-band. A transmitter 1 supplies energy at radio frequency $f_1$ to a directive antenna 2 over a bandpass filter 3. Antenna 2 is adapted to radiate energy in a beam having a width in the elevation plane of ½° and width in the azimuth plane of 4°, measured in both cases to the half-power points. The angle which this beam makes with the ground is varied in reciprocating fashion over an elevation range of 0° to 7° by a scanning device indicated by block 4 whose operation is controlled by a timing unit indicated by block 5.

The arrangement constituted by the antenna 2, scanning device 4, and timing unit 5 as part of the Precision Approach Radar equipment which is used at many airports for G.C.A. purposes, and it is therefore considered unnecessary to describe it in detail. Briefly, a long waveguide has a large number (more than 200) of small dipoles mounted on one face of the waveguide, each dipole being fed by a small probe extending into the waveguide. One wall of the waveguide is movable, and as it is moved the phase constant of the wave propagated down the guide changes, with consequent alteration of the phase of the energy picked up at each probe. The radiations from the individual dipoles combine to give a beam whose angular position varies with the phase constant of the waveguide and hence with the position of the moving wall.

The moving wall is moved by a rotating cam so shaped as to give a beam angle directly proportional to cam shaft position over the scan range (0° to 7°), and the camshaft is driven by a synchronous motor controlled by a quartz crystal.

The transmitter 1 comprises a 1 kw. magnetron which is pulse modulated via modulator unit 6 at a frequency of 10 kc./s. by energy from oscillator source 7 during the "up" portion of the scan, or at a frequency of 9 kc./s. by energy from oscillator source 8 during the "down" portion of the scan, the modulator 6 having its input connection suitably switched between sources 7 and 8 by switching unit 9 whose operation is controlled by timing unit 5 in agreement with the scanning control.

In addition to the above-described elements which belong to the glide-path function of the beacon, there is indicated at 10 certain auxiliary elements which permit the beacon to serve as a responder for distance-measuring purposes. When this function is required, the aircraft transmits a train of locally generated 10 kc./s. pulses as a modulation of a carrier wave of frequency $f_2$ slightly different from the beacon frequency $f_1$. This energy of carrier frequency $f_2$ is received on the beacon antenna system 2, selected by filter 11 and detected in receiver-detector 12 to recover the 10 kc./s. modulation pulse train. The recovered pulse train is selected by filter 13 applied to the 10 kc./s. oscillator source 7 to phase-lock the output thereof.

Referring now to FIG. 2A, this illustrates the extent of the beam scanning in the plane of elevation from 0° (ground line) to a maximum of 7°. FIG. 2B illustrates the variation of the beam angle with time over a complete scan cycle.

The principal characteristics of the beam are as follows.

Beam width (elevation) ____ ½° to 3 db points.
Beam width (azimuth) ____ 4° to 3 db points.
Angle of scan _____ 0°–7° elevation, linear with time.
Beam position accuracy ____ ±2 minutes of arc.
Scan cycle time _____ ½ second.
Power gain _____ 20,000 times.

As shown in FIG. 2B, the antenna system scans from 7° down to 0° in ⅛ second and this scan is very linear with time. It then takes ⅛ second to reverse its direction or "turn over." Then it scans linearly from 0° to 7° after which it takes ⅛ second to turn over at the top end, thus completing the scan cycle. In order to avoid ground reflections, the transmitter is cut off whenever the beam is below ½°. (This is an arbitrary figure, and can be varied to suit the site.)

If such an antenna system is placed adjacent to touch-down with its scan facing an approaching aircraft the beam will pass rapidly through the aircraft antenna twice per scan cycle, once going down, and once going up.

As the scan is accurately controlled, it can be seen that the higher the aircraft is, at any particular distance, the longer will be the time interval between the instants at which the down and up scans pass through the aircraft aerial.

The airborne set, therefore, has only to time the interval between reception of down and up scans to determine its glide angle. For example, referring to FIG. 3, in the case of the aircraft 14 flying on the 3.5° glide path 15, the interval between reception during a downward scan and reception during the immediately following upward scan totals 250 milliseconds, this period being made up of the $\frac{1}{16}$ sec. for completion of the downward scan, ⅛ sec. for turnover of the scanning, and another $\frac{1}{16}$ sec. for the upward scan to reach the craft. For the aircraft 16, however, flying on the 5.25° glide path 17, the corresponding interval totals 312.5 milliseconds.

The rate of scan of the beam is accurately controlled so that it scans through an angle of 5 minutes in 1.5 milliseconds. Thus the airborne set has only to measure the time interval between a down scan and the immediately following up scan to within 1.5 milliseconds to achieve accuracy to within 5 minutes of arc in the indication of the glide path angle then being used.

Referring now to FIG. 4, this shows in block schematic form the essential elements of a glide path receiver equipment responsive to the output from the glide path approach beacon illustrated in FIG. 1. The beacon energy is received and detected in antenna unit 18. The output of antenna unit 18 is applied via a low pass filter 19 and variable attenuator 20 to an amplifier 21. A small part of the output from amplifier 21 is fed back over connection 22 to adjust the variable attenuator 20 for automatic gain control purposes.

The output from amplifier 21 consists of short trains of pulses of 10 kc./s. pulse repetition frequency, derived from the beacon energy received when the beam traverses the aircraft during a up scan, and short trains of pulses of 9 kc./s. pulse repetition frequency derived from the beacon energy received when the beam traverses the aircraft during a down scan.

The 10 kc./s. pulse trains in the output of amplifier 21 are selected by a band pass filter 23 and then applied to a detector 24, whereby each train of pulses is converted to a single rather broad pulse. This broad pulse is applied to a pulse forming circuit 25 in which it is squared up, and a sharp pulse is derived from the trailing edge of the squared-up broad pulse for application over connection 26 to one half-section 27 of an Eccles-Jordan type of bi-stable flip-flop device 28. In similar fashion each of the 9 kc./s. pulse trains in the output of amplifier 21 is selected by band pass filter 29, converted in detector 30 into a single broad pulse from which there is produced in pulse forming circuit 31 a sharp pulse for application over connection 32 to the other half-section 33 of flip-flop device 28.

The need for the pulse-forming circuits 25 and 31 arises from the fact that the elevation-width of the beam is ½°, which is a comparatively large fraction of the scanning range, and the width of the pulses appearing at the outputs of detectors 24 and 30 is too great for accurate time measurement. Although the squared-up pulse width may vary with the aircraft's distance from the beacon station, it will be the same for both up and down scans, and therefore the time interval between the trailing edges of the squared-up down and up pulses will remain accurate.

Once the flip-flop device 28 has been triggered by a pulse applied over connection 26, half-section 27 will remain in one of its two possible states until the device is re-triggered by a pulse applied over line 32. There can thus be obtained from half section 27 an output whose duration is equal to the time interval between reception on the aircraft of the beacon signal during the downward part of the scanning cycle, and reception of the beacon signal during the upward portion of the scanning cycle. This output from half section 27 is applied to a comparison device, indicated by block 34, in which its duration period is compared with a time duration reference signal from reference source 35, and the result of the comparison is translated into an output current of appropriate magnitude which is applied over connection 36 to operate a glide-path indicator 37.

The other half section 33 of flip-flop device 28 is applied to trigger a 1-shot multivibrator 39 whose output is fed through a resistance-capacity smoothing arrangement 40 to the usual flag-alarm circuit of glide path indicator 37.

The comparison device 34 and reference source 35 may obviously be of any type which will carry out the required function, but preferably take the form indicated by the block diagram of FIG. 5.

Referring to FIG. 5, the reference source 35 comprises an oscillator 41 of frequency 666 c./s., followed by a pulse former 42 which converts the sinusoidal output of oscillator 41 into sharp pulses of repetition period 1.5 milliseconds, which as already mentioned is the time required for the beam to scan through an angle of 5 minutes. Output from pulse former 42 is applied via electronic gating devices 43 and 44 as input to a first binary counter chain 45 (Glide Slope Selector Counter) comprising eight bi-stable devices B1 . . . B8 connected in cascade and having a maximum counting capacity of 255 ms. Each of these bistable devices is similar to the Eccles-Jordan type flip-flop device 28 shown in FIG. 4, and provides two outputs, one from each half section of the device. Associated with the binary counter chain 45 is a path selector unit 46 containing a plurality of coupling links L1 . . . L8 each associated with a respective one of the bi-stable devices B1 . . . B8, and serving to route a predetermined one of the two outputs of the associated bi-stable device to a coincidence unit 47 adapted to supply output only when the inputs received over all the coupling links L1 . . . L8 are all of the same potential sign.

Gate 43 is opened (i.e., unblocked) only when it receives a potential of correct sign over connection 27a from the main flip-flop device 28 shown in FIG. 4.

Gate 44 is normally open but is blocked by output from coincidence unit 47.

The gating potential from line 27a is also applied to all the bi-stable devices B1 . . . B8 through a capacitor 48 for re-setting purposes.

A second binary counting chain 49 (the Read Out Counter chain) with a maximum counting capacity of 15 comprises four bi-stable devices B9 . . . B12 of the Eccles-Jordan type connected in cascade. This second chain receives pulse input from pulse former 42 via electronic gating devices 50 and 51. The output from each half-section of each of the bi-stable devices are applied to a second coincidence unit 52 in such manner that unit 52 gives a coincidence output only after 15 pulses have been fed into chain 49 from pulse former 42. In addition, unit 52 feeds into the glide path indicator 37 a current which is proportional to the number of pulses actually counted in chain 49, the central reading on indicator 37 corresponding to a count of seven pulses. Selector unit 46 is conveniently made as a plug-in unit for a desired glide angle, with the links so arranged that coincidence circuit 47 is operated when the counter has received seven less than the total number of pulses corresponding to the time interval associated with the desired glide angle. Gate 50 is unblocked only when it receives output from coincidence unit 47 via phase inverter 53.

Gate 51 is blocked only when it receives output from coincidence unit 52.

The output from coincidence unit 47 is also applied to all the bi-stable devices B9 . . . B12 through a capacitor 54 for re-setting purposes.

Referring now to FIGS. 6A and 6B jointly, these illustrate the construction of the antenna unit 18 shown in FIG. 4 as a single block. It will be seen that the unit comprises a horn antenna 55 which is coupled over a waveguide filter 56 into a waveguide section 57 which is short-circuited at its far end and which has a crystal detector mounted therein in normal manner as indicated by crystal holder 58, the output from the crystal being taken off through a coaxial line socket 59. The filter 56 comprises two sections 60 and 61 as shown in FIG. 6B, each terminated at each end by three reactance posts. Each section is provided with the customary tuning screw as shown at 62. Filter 56 is adjusted to reject signals from nearby X-band radar equipments which might otherwise damage the crystal detector.

The operation of the time interval comparison system described with reference to FIG. 5 varies slightly depending upon whether the glide path meter reading is above or below the meter scale, or within the meter scale, and hence will be described for each case separately.

*Case A.—Glide-Path Meter Reading Somewhere on Scale*

Up-scan signal (10 kc./s.) received:
    Primary flip-flop 28 operates
    Glide-slope selector counter 45 reset to zero
    Gate 43 is closed
    Gate 44 is opened
    Gate 50 is closed
Down-scan signal (9 kc./s.) received:
    Primary flip-flop 28 operates
    Gate 43 opens
    Signals from the (666.66 c.p.s.) are fed into the Glide Slope Selector Counter 45 until the preselected number is reached and an output is obtained from the coincidence circuit; then
    Gate 44 is closed
    Read-out counter 49 is reset to zero
    Gate 50 is opened
    Signals from the pulse former 42 are now fed into the Read-out counter
Up-scan signal is received:
    Primary flip-flop 28 operates
    Glide-slope selector counter 45 reset to zero
    Gate 43 is closed
    Gate 44 is opened
    Gate 50 is closed
        *Note.*—At this point a number of counts have entered the Read-out counter 49 and these are displayed on the Glide-Path meter 37 indicating the Glide Angle being followed.
The sequence is repeated

*Case B.—Glide-Path Meter Reading Zero, i.e., Well Below the Selected Glide-Path*

Up-scan signal received:
    Primary flip-flop 28 operates.
    Glide-slope selector counter 45 reset to zero
    Read-out counter 49 reset to zero
    Gate 43 is closed
    Gate 50 is closed
Down-scan signal received:
    Primary flip-flop 28 operates
    Gate 43 opens
Up-scan signal received: The sequence is then repeated, no counts being delivered to the read-out counter

*Case C.—Glide-Path Meter Reading Maximum, i.e., Well Above the Glide-Path Selected*

Up-scan signal received:
    Primary flip-flop 28 operates
    Glide-slope selector counter 45 reset to zero
    Gate 43 is closed
    Gate 44 is opened
    Gate 50 is closed
Down-scan signal received:
    Primary flip-flop 28 operates
    Gate 43 is opened
    Signals from the pulse former 42 are fed in until the coincidence circuit 47 on the Glide-slope selector counter 45 gives an output
    Gate 44 is closed
    Read-out counter 49 is reset to zero
    Gate 50 is opened
    Gate 51 is opened
        Signals from the pulse former 42 now enter the read-out counter 49 until a count of 15 is reached and the read-out counter coincidence circuit gives an output.
    Gate 51 is closed
Up-scan signal received: The sequence is then repeated While the principles of the invention have been described above in connection with specific embodiments, and particular modifications thereof, it is to be clearly understood that this description is made only by way of example and not as a limitation on the scope of the invention.

What we claim is:

1. A radio approach beacon system for aircraft in which an arc of the approach zone is scanned to and fro with predetermined angular velocity by a beam whose width along the arc of scanning is very narrow comprising; means carried on said aircraft for selecting a predetermined approach path for said aircraft, means for determining the time interval between the pulse of energy received by said aircraft when the beam traverses said aircraft in a predetermined sense of scanning and the pulse of energy received when the aircraft is traversed again by said beam in the immediately following reversal of scanning, and means for giving an indication as to whether or not such time interval corresponds with said predetermined approach path for said craft.

2. A radio navigation system for aiding the navigation of a mobile craft along a desired path comprising a beacon station, means at said beacon station for arcuately scanning a beam of high frequency energy through a predetermined angle at a constant periodicity, means for impressing different characteristics on said beam during respective portions of the scanning period, a receiver carried by said mobile craft, means for producing an output signal each time said receiving means is illuminated by said beam, a source of reference signals having a given repetition frequency, each cycle thereof corresponding to a discrete angular portion of said scan, means to select a desired number of said cycles corresponding to said desired path, means to count the actual number of cycles corresponding to the actual approach path of said craft, means to compare said actual number of cycles of said actual path with said number of cycles of said desired path and means responsive to said comparison to indicate the deviation of said craft from said desired path.

3. A radio navigation system for aiding the navigation of a mobile craft along a desired path comprising a beacon station, means at said beacon station for arcuately scanning a beam of high frequency energy through a predetermined angle at a constant periodicity, means for impressing different characteristics on said beam during respective portions of the scanning period, a receiver carried by said craft, means for producing an output signal each time said receiving means is illuminated by said beam, a source of reference signals having a given repetition frequency, each cycle thereof corresponding to a discrete angular portion of said scan, means to select a desired number of said cycles corresponding to said desired path, means to count the actual number of said cycles between two successive illuminations of said receiving means corresponding to the actual approach path of said craft, means to compare the number of cycles of said actual path with the number of cycles of said desired path and means responsive to said comparison to indicate the deviation of said craft from said desired path.

4. A radio navigation system for aiding the navigation of a mobile craft along a desired path comprising a beacon station, means at said beacon station for arcuately scanning a beam of high frequency energy through a predetermined angle at a constant periodicity, means for impressing different characteristics on said beam during respective portions of the scanning period, a receiver on said mobile craft, means for producing an output signal each time said receiving means is illuminated by said beam, a source of reference signals having a given repetition frequency, each cycle thereof corresponding to a discrete angular portion of said scan, first counting means, means responsive to a first output signal to start said first counting means to count said reference signals, selecting means coupled to the output of said first counting means for selecting a desired count of said first counting means corresponding to said desired path for said craft, second counting means, means responsive to said selecting means for stopping operation of said first counting means at a predetermined number of counts before said desired count and initiating operation of said second counting means, means in said second counting means for counting said predetermined number of counts, means responsive to a second output signal successively following said first output signal to stop said counting operations and indicating means responsive to the output of said second counting means for indicating the deviation of said craft from said desired path.

5. A radio navigation system for aiding the navigation of a mobile craft along a desired path comprising a beacon station, means at said beacon station for arcuately scanning a beam of high frequency energy through a predetermined angle at a constant periodicity, means for impressing different characteristics on said beam during respective portions of the scanning period, a receiver on said mobile craft, means for producing an output signal each time said receiving means is illuminated by said beam, a source of reference signals, a first counter, means responsive to an output signal for initiation of operation of said first counter for counting said reference signals, selecting means coupled to the output of said first counter for selecting a desired count of said first counter corresponding to said desired path for said craft, a second counter, means responsive to said selecting means for stopping operation of said first counter at said desired count and initiating operation of said second counter, means in said second counter for counting a predetermined number of reference signals, and indicating means controlled by said second counter for indicating the relative position of said mobile craft with respect to the desired path corresponding to the selected count of said first counter.

References Cited in the file of this patent
UNITED STATES PATENTS

| | | |
|---|---|---|
| 2,112,283 | Fritz | Mar. 29, 1938 |
| 2,586,810 | Frum | Feb. 26, 1952 |
| 2,665,410 | Burbeck | Jan. 5, 1954 |
| 2,665,411 | Frady | Jan. 5, 1954 |
| 2,738,461 | Burbeck et al. | Mar. 13, 1956 |
| 2,826,378 | Childs | Mar. 11, 1958 |
| 2,829,364 | Latimer | Apr. 1, 1958 |